E. F. DHART.
Wheel-Cultivator.
No. 69,081. Patented Sept. 24, 1867.
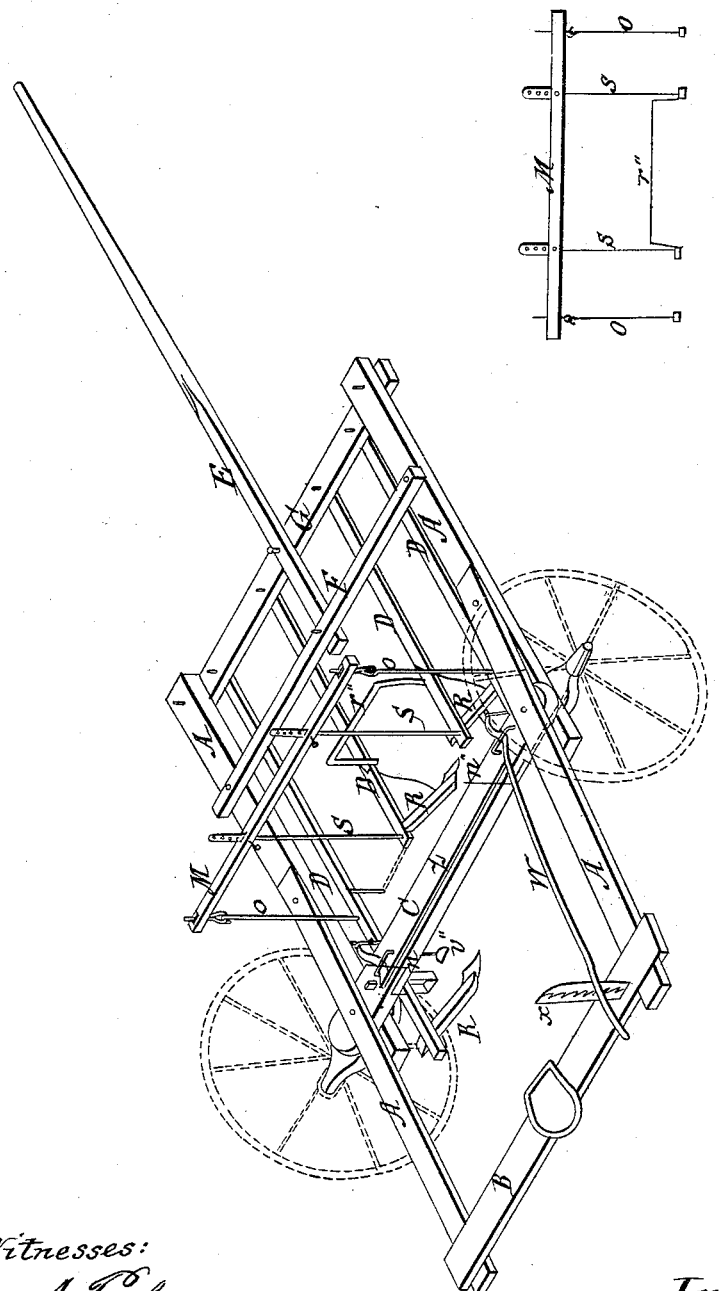
Witnesses:
Ira A. Palmer.
W. B. Richards.
Inventor:
E. F. Dhart.

UNITED STATES PATENT OFFICE.

E. F. DE HART, OF SWAN CREEK, ILLINOIS.

IMPROVEMENT IN CULTIVATORS.

Specification forming part of Letters Patent No. 69,081, dated September 24, 1867.

*To all whom it may concern:*

Be it known that I, E. F. DE HART, of Swan Creek, Warren county, Illinois, have invented a new and Improved Cultivator for Cultivating Plants in Rows; and I do hereby declare that the following is a full, clear, and exact description thereof, which will enable others skilled in the art to make and use the same, reference being had to the annexed drawings, making a part of this specification, in which—

Figure 1 is a perspective view of my invention; Fig. 2, a sectional view, showing the method of adjusting the plows vertically.

This invention relates to a new and improved cultivator designed more especially for cultivating corn; and it consists in a novel manner of arranging the plow-beams and frame so that a simple device may give perfect control of the plows.

The main frame A is constructed of two side pieces, connected in front by the cross-pieces F and G, and at the rear by the seat-board B, and the whole mounted on the axle C and supported by wheels.

To the cross-piece M, I attach the plow-beams by means of the rods $o$ $o$ and $s$ $s$. The inside plows, R R, are attached to the cross-piece M by the rods $s$ $s$, provided with holes at the top for adjusting the depth of plows in the ground. The outside plows are attached by the rods $o$ $o$ to same piece, M, by hooks. The middle plows can swing freely on the pin which secures them in the cross-piece M, allowing side movement of these plows to avoid the plants not in row. This side or lateral movement is given by the feet in the stirrup $v''$.

The plows are all thrown out of the ground and swung up by means of the lever $w$, operating in connection with the beams D and rack $x$.

The plows on either side are raised by the levers $n''$ $n''$, attached at the rear of the axle.

What I claim as my invention, and desire to secure by Letters Patent, is—

1. The frame A B G F, beams D D D D, cross-piece M, rods $o$ $o$ $s$ $s$, connecting-bar $r'''$, and levers $v''$ $v''$, constructed as described, and for the purpose set forth.

2. The levers $n''$ $n''$, in combination with the main frame and beams D, substantially as described, and for the purpose set forth.

3. The cross-piece M, in combination with the rods $s$ $s$ $o$ $o$ and beams D, substantially as described, and for the purpose set forth.

E. F. DE HART.

Witnesses:
W. B. RICHARDS,
IRA A. PALMER.